United States Patent [19]

Beaugrand et al.

[11] 3,824,499

[45] July 16, 1974

[54] DIODE PHASE MODULATOR

[75] Inventors: Claude Beaugrand; Roger Ermoglio, both of Paris, France

[73] Assignee: Thomson-CSF, Paris, France

[22] Filed: July 31, 1972

[21] Appl. No.: 276,383

[30] Foreign Application Priority Data

Aug. 17, 1971 France ............................ 71.29963

[52] U.S. Cl. ............... 332/16 R, 307/262, 307/322, 332/52

[51] Int. Cl. ............................................. H03c 3/22

[58] Field of Search ........ 332/16 T, 52, 16 R, 29 R; 331/107 T; 307/262, 322

[56] References Cited

UNITED STATES PATENTS

| | | | |
|---|---|---|---|
| 2,268,837 | 1/1942 | Lutzenberger | 332/52 |
| 3,196,370 | 7/1965 | Rabinovici et al. | 332/52 X |
| 3,212,027 | 10/1965 | Ko | 331/107 T X |
| 3,373,381 | 3/1968 | Thomas | 332/29 R |
| 3,437,957 | 4/1969 | Ames | 332/16 |
| 3,705,366 | 12/1972 | Vergnolle | 332/52 X |

*Primary Examiner*—Alfred L. Brody

*Attorney, Agent, or Firm*—Cushman, Darby & Cushman

[57] ABSTRACT

A modulator comprising a diode to which both the modulating signal and the signal to be modulated are applied. The diode circuit comprises an element whose resistance varies inversely in relation to the amplitude of the direct current detected in the diode. This element is preferably a diode.

8 Claims, 9 Drawing Figures

DIODE PHASE MODULATOR

The present invention relates to diode phase-modulators utilised in particular as frequency-converters in passive responder systems of the kind employed in aerial navigation.

The known phase modulators comprise at least one phase-shift element with at least one diode having two terminals, means for applying the signal to be modulated to one of said terminals of each diode, means for applying the modulating signal to one of the terminal of each diode, and a closed circuit between the two terminals of each diode for the direct current detected thereby.

The modulators used in such system must satisfy two contradicting requirements:

they should have the highest possible efficiency in order to be able to achieve a long range;

they should have a high-power rating in order to prevent them being destroyed when submitted to interrogation by aircrafts in close proximity.

Also, the known circuits comprise an associated bias circuits for a diode, this circuit modifying the working point of the diode as a function of the power which it receives. This bias circuit produces a variable direct current which rises as the power received by the diode rises.

Devices of this sort require an associated power source to supply the bias circuits. The complexity, the size and the power requirements of this kind of equipment increase with the number of diodes in the device and this is a major drawback where passive responders are concerned, these only having a limited power source and requiring to be as far as possible autonomous in operation.

The modulator in accordance with the invention, unlike the known devices, does not use an external bias source requiring an additional power source. According to the invention there is provided a phase-modulator in which the closed circuit between the two terminals of each diode for the direct current detected thereby comprises an element whose resistance varies inversely in relation to the amplitude of said direct current.

For a better understanding of the invention and to show how the same may be carried into effect, reference will be made to the drawings accompanying the following description and in which:

FIGS. 1 and 2 illustrate circuits comprising a diode-modulator operating respectively by reflection and by transmission;

FIGS. 3 and 4, by way of example, provide diagrams relating to the operation of the systems shown in FIGS. 1 and 2;

Figure 1:
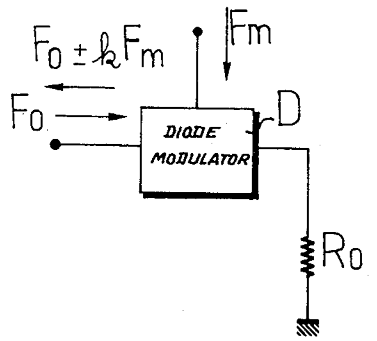
Figure 2:
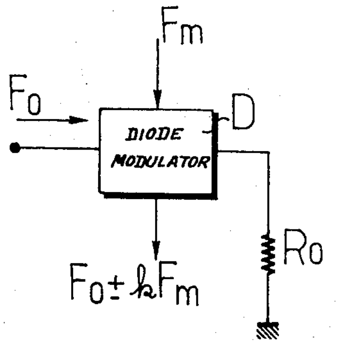

In FIG. 1, the simplest block diagram of a diode modulator D operating by reflection has been shown: the signal to be modulated, of frequency F*o*, and the modulating signal, of frequency F*m*, are applied to the diode which has here been symbolised by a rectangle; the d.c. circuit of the diode is closed across a resistor R*o*; in a known manner, buffer elements (capacitors, inductors) are arranged in the circuit carrying the frequencies F*o*, F*m*, F*o* ± *k*F*m* (where *k* is a whole number). The diagram of FIG. 2 relates to a diode modulator operating by transmission.

Figure 3:
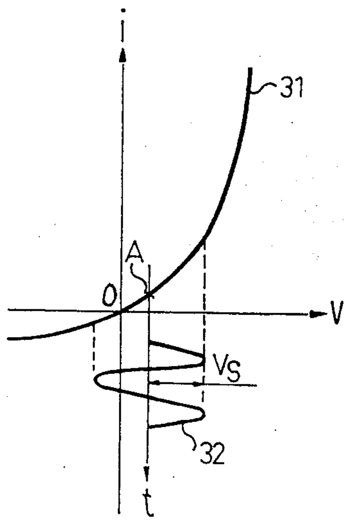
Figure 4:
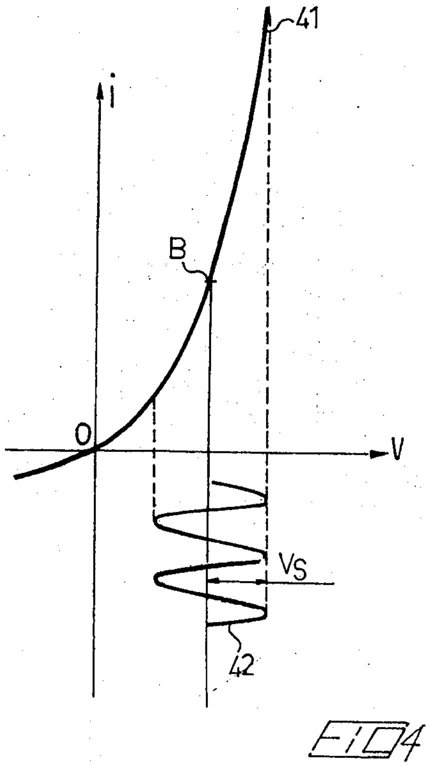

The operation of these circuits will be better understood from a consideration of FIGS. 3 and 4 where the current-voltage characteristic of the diode D (curve 31, FIG. 3, curve 41, FIG. 4) is represented, and where A (FIG. 3) and B (FIG. 4) represent two working points thereof, defined by the respective powers of the applied signals of frequency F*o*.

FIG. 3 relates to the case of the incident signal of relatively low power; the detected current flowing through the diode is small; the working point, A, is close to the origin O; the voltage across the terminals of the diode is the sum of the voltage $V_A$ at the point A and that of the modulating signal, represented, in a simple case, by the sinusoidal curve $V(t)$, 32, the peak voltage of the latter, $V_s$, being by hypothesis greater than $V_A$. It will be seen thus that the diode alternately occupies two successive states.

a. When the modulating signal biases it in the forward direction ($V(t) > -V_A$), it behaves as a low-impedance; a direct current flows through it, the direct current circuit being closed across the resistor R*o*.

b. When the modulating signal biases it in the reverse direction ($V(t) < -V_A$), it behaves as a high-impedance.

Summarising, the diode, under the action of a modulating signal, behaves as an impedance having two distinct extreme values and this is translated into terms of a difference in the electrical length of the associated high-frequency circuit; the reflected high-frequency wave is thus a wave which exhibits phase-modulation, this being characterized by its modulation efficiency defined as being the ratio of the power of the modulated spectrum line used, to the power of the spectrum line being modulated.

As the power of the signal being modulated increases, the detected current in the diode increases and the working point of the diode shifts away from the origin O. FIG. 4 relates to the case of a relatively high-power input signal; the voltage across the terminals of the diode, which is the sum of the voltage $V_B$ at the point B and the voltage $V(t)$ (curve 42), is always positive, $V_B$ being greater than $V_S$: the diode continues to conduct but the voltage across its terminals varies between $V_B - V_S$ and $V_B + V_S$ so that it acts as a variable impedance whose impedance sweep is small; the amplitude of the resultant phase-modulation is thus reduced and consequently likewise the modulation efficiency. If R*o* is then increased, the direct current diminishes and the point B tends to return towards A, this having the effect of increasing the modulation efficiency; however, since the power to be modulated remains unchanged, and therefore by hypothesis remains substantial, with the reverse alternation of the signal being modulated, the voltage across the terminals of the diode may reach the latter's breakdown voltage and destroy it.

It is therefore preferable to shift the working point of the diode away from the origin when the power increases, in order to prevent breakdown occurring. The modulation efficiency of course reduces, but this is generally the case when power is emitted by an electromagnetic system approaching the device which forms the object of the invention. In this case, the receiver element of the electromagnetic system is approaching too, and the reception of the signal modulated by the device continues to take place under acceptable conditions because the reduction in efficiency in the device is compensated for by reduction in the signal propagation losses.

Thus, the modulation efficiency and the lower rating of the diode are a function of the resistance R*o*. An appropriate choice of this resistance makes it possible, in accordance with the invention, to influence that two parameters in order to prevent the breakdown voltage being reached, this at the expense of an acceptable increase in the mean current through the diode, whilst retaining maximum efficiency at low powers.

Figure 5:
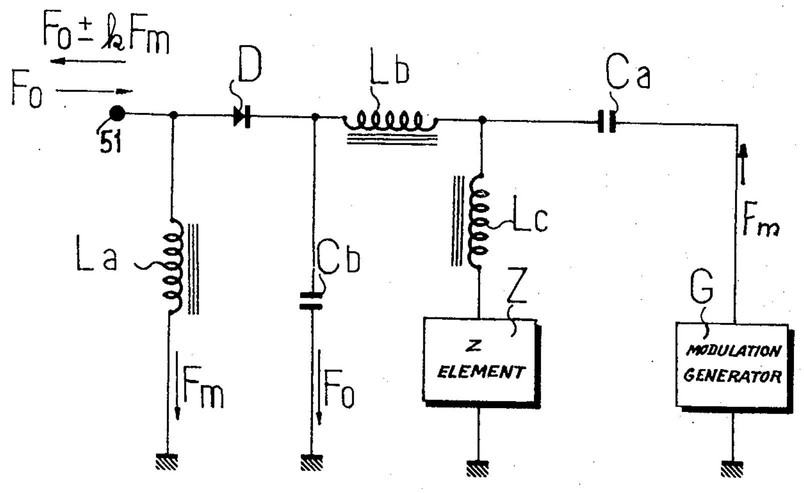
FIG. 5 is the block diagram of an elementary phase-modulator in accordance with the invention, operating by reflection.

FIG. 5 relates to the simplest case of a $O-\pi$ phase-modulator in accordance with the invention, operating by reflection.

The input signal of frequency F*o* is applied to the terminal 51 representing the output of the transmission line having a surge impedance Z*o*, coupled on the one hand to one of the terminals of the diode D and on the other to one of the terminals of a choke whose other terminal is earthed, this choke closing the circuit for the modulating signal and blocking the signals at the frequency F*o*. The other terminal of the diode is coupled on the one hand to a capacitor C*b* closing the circuit for the signals of frequency F*o*, and on the other hand to one of the terminals of a choke L*b* designed in order to block the signals at frequency F*o* but to transmit those at the modulation frequency F*m* which is very much lower than F*o* (for example F*o* = 10,000 Mc/s and F*m* = 500 Mc/s). The second terminal of the choke L*b* is coupled across the capacitor C*a* to the generator G producing the modulation signals, this generator being constituted in a simple case by a sinusoidal voltage source of frequency F*m*.

Figure 6:
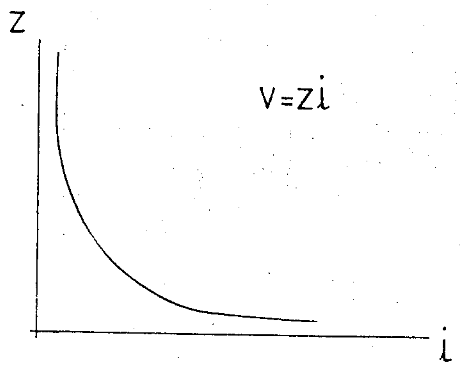
FIG. 6 is an explanatory diagram.

In the d.c. load circuit of the diode, between earth and the junction point of impedance L*b* and capacitor C*a*, an element Z is arranged whose resistance R*o* decreases when the current flowing through it increases, as indicated in FIG. 6, this element being in series with a choke Lc which blocks the signals of frequency F*m*.

Thus, from the foregoing, it will be seen that when the power level being modulated is low, the current itself is low so that R*o* is high and consequently the modulation efficiency is at a maximum.

Thus, when the power to be modulated rises, the current increases so that in accordance with the non-linearity Z, the resistance R*o* is small; the modulation efficiency diminishes but the power rating, as we have seen, increases. This system thus makes it possible to have maximum modulation efficiency when the power to be modulated is low, but also to withstand high powers (for modulation) without any risk of destruction of the modulation diode or diodes.

The non-linear element Z can be produced in a variety of ways.

FIG. 6 shows a diagram representing the value of Z in relation to the current *i*.

It may be constituted by a simple diode, suitably biased, the resistance of which when forward-biased decreases as the current flowing through it increase.

The element Z can likewise contain a combination of elements with linear and non-linear characteristics, for example a diode bridge, thus making it possible to adjust the shape of its characteristic.

The input signal of frequency F*o* is reflected by the diode with a phase-shift equal to O or $\pi$ depending upon whether the voltage applied to it is a forward or reverse voltage; this phase-shift is thus modulated at frequency F*m*, the frequencies Fo $\pm$ Fm corresponding then to the maximum power spectral lines of the reflected signal.

The phase-modulation in accordance with the invention is of course not limited to the values $O-\pi$ nor to circuits operating by reflection.

Figure 7:
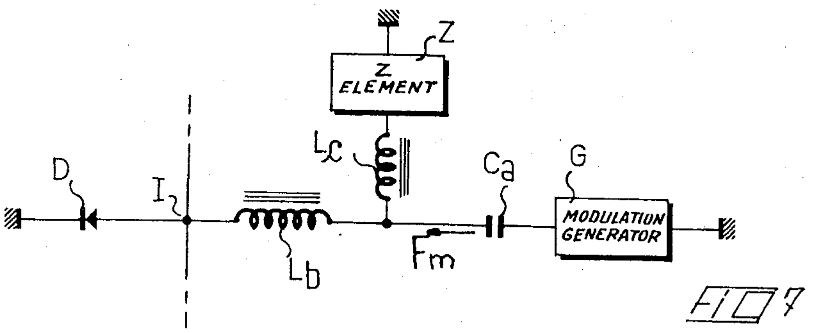
FIG. 7 is the diagram of an elementary basic circuit for modulators in accordance with the invention, operating by transmission.

FIG. 7 is the block diagram of a basic element of the diode modulators in accordance with the invention, operating by transmission, the modulator as a whole comprising a certain number of these elements as we shall see hereinafter.

This basic element essentially comprises the same elements as the modulator shown in FIG. 5, with the exception of the fact that the diode can be earthed directly, the elements L*a* and C*b* then being discarded.

Figure 8:
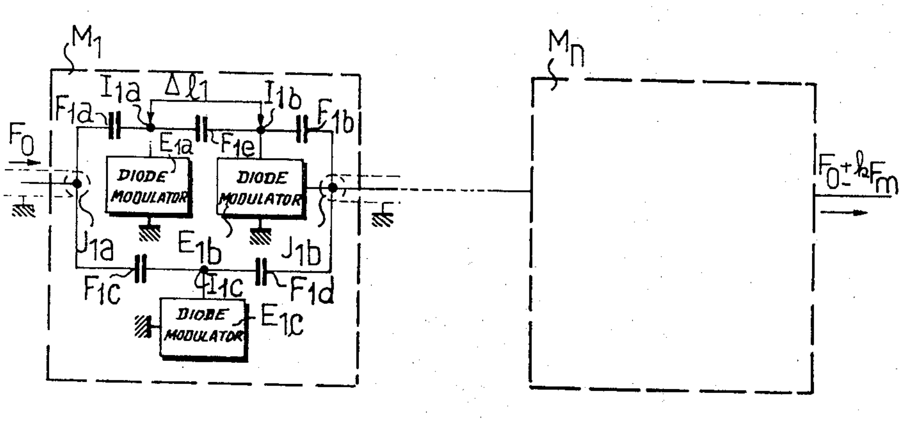
FIGS. 8 and 9 are block diagrams of examples of phase-modulators in accordance with the invention, operating by transmission.

FIG. 8 is a first example of a phase-modulator in accordance with the invention, operating by transmission; it essentially comprises *n* modulation units, $M_1, M_2 \ldots M_n$, only the unit $M_1$ of which has been shown in any detail. Each of these units is made up of three elements $E_{1a}$, $E_{1b}$, $E_{1c}$ identical to the basic element shown in FIG. 7. These elements are inserted in the transmission line by means of two identical junctions $J_{1a}$ and $J_{1b}$ with three channels, the element $E_{1c}$ being coupled to one of the output channels of the junction $J_{1a}$ by the capacitor $F_{1c}$ and to one of the input channels of the junction $J_{1b}$ by the capacitor $F_{1d}$, as indicated in the FIG. 8, and the elements $E_{1a}$ and $E_{1b}$, spaced apart by $\Delta l_1$ being arranged in series between the other output channel of the junction $J_{1a}$ and the other input channel of the junction $J_{1b}$, using capacitors $F_{1a}$, $F_{1b}$ and $F_{1e}$, the lengths between the respective common points of the three channels of the junctions $J_{1a}$ and $J_{1b}$, and the elements $E_{1a}$ and $E_{1c}$, on the one hand, and $E_{1b}$ and $E_{1c}$ on the other, all being equal to $\lambda_o/4$ where $\lambda_o$ is the wavelength corresponding to frequency F*o*.

When the unit $E_{1c}$ is biased in the forward direction, it behaves as a low-impedance circuit and thus applies a high-impedance circuit to the terminals $J_{1a}$ and $J_{1b}$ in the circuit because of the electrical properties of the quarter-wave transmission line sections. The power of the input signal at the frequency F*o* is thus transmitted through a propagation line passing via the elements $E_{1a}$ and $E_{1b}$ which should therefore be reverse-biased (they then have a high impedance, so that the transmission losses are low).

Conversely, if the elements $E_{1a}$ and $E_{1b}$ are biased in the forward direction, and the elements $E_{1c}$ in the reverse direction, the input power, at frequency F*o*, will be propagated across the element $E_{1c}$.

The difference in the electrical length between the two propagation links is represented by the distance $\Delta l_1$ between the elements $E_{1a}$ and $E_{1b}$ so that if the units $E_{1a}$, $E_{1b}$, $E_{1c}$ are appropriately modulated in accordance with the criteria described, using a modulating wave of frequency F*m* << F*o*, the input wave of frequency F*o* arriving through the input channel of the junction $J_{1a}$ will be picked up on the output channel of the junction $J_{1b}$ with a phase-modulation which is a function of the difference $\Delta l_1$ between the two propagation links.

This kind of phase-modulation, operating by transmission and having the same high-frequency and d.c. circuits as those described in relation to the phase modulator operating by reflection (FIG. 5) has the same properties as the latter as far as modulation efficiency and power rating are concerned.

The arrangement in series of several modulators operating by transmission, $M_1, M_2 \ldots M_n$, which modulators are identical to one another but have different lengths $\Delta l_i$ ($i = 1, 2 \ldots n$), makes it possible, by adding specific modulation controls, to achieve the desired phase-modulation law.

In order not to overburden the figure, the control circuits for the elements $E_{1a}$, $E_{1b}$, $E_{1c}$, which should be appropriately synchronised and are within the scope of the person skilled in the art, have not been shown. It goes without saying that the controls for the various modulators can be individual ones or may be grouped, and that the control voltages can be picked off either at the terminals of individual generators, or by means of switches across the terminals of one and the same generator G provided per modulator Mi or provided just once for the whole assembly.

Figure 9:
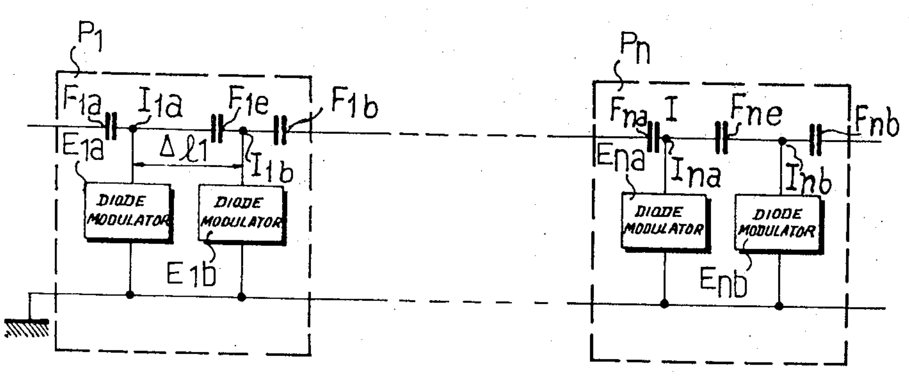

FIG. 9 is another example of a phase-modulator in accordance with the invention, operating by transmission; it utilises the known principle of "impedance disturbance" phase-shift devices and comprises, by way of impedances, assemblies such as the element $E_i$.

Those skilled in the art will be aware that a "impedance disturbance" phase-shift system is constituted by a transmission line of characteristic impedance $Zc$, to which there are connected pairs of impedances $P_1$, the two impedances of a pair being spaced at an interval of $\Delta l_i$ and simultaneously adopting either the value Z1 or the valee Z2, under the action of an external signal; each of these two values corresponds to an apparent electrical length which is a function, in particular, of the value of $\Delta l_i$ for the transmission line in question, hence there is a variation in the phase of the signal of the output in relation to that of the signal at the input.

Thus, as shown in FIG. 9, if the impedances of each pair $P_1$ ($i = 1, 2 \ldots n$) are constituted by elements identical to the element described in relation to FIG. 7 (element $E_i$ of FIG. 8) coupled to the line by means of capacitors $F_{1a}$, $F_{1b}$ and $F_{1d}$ as indicated in FIG. 1, where $i = 1$ and $n$ and if the two states, $Z_1$ and $Z_2$, are produced by a modulation signal of frequency $Fm$, then the system will behave as a phase-modulator operating by transmission and having the same properties, as far as modulation efficiency and power rating (power being modulated), as the modulators hereinbefore described.

All the phase-modulators in accordance with the invention can be produced using any of the known technologies: coaxial lines, waveguides, three-layer lines, microstrips, etc.

The invention is applicable to frequency converter systems in particular for active or semi-active responder (transponder) systems, either on board aircraft or not, in which the power of the received signal varies within wide proportions.

What is claimed is:

1. A diode phase modulator, comprising:
an input for receiving a microwave signal to be modulated and providing a modulated signal;
a diode having a first terminal connected to said input, and a second terminal;
a first choke connected between said input and an earthed terminal;
a capacitor connected between the second terminal of said diode and said earthed terminal;
a second choke having a first terminal, connected to the second terminal of said diode and a second terminal;
a modulation generator, for providing a modulating signal, connected, in series with a second capacitor, between the second terminal of said second choke and said earthed terminal, and
a d.c. bias circuit connected between said earthed terminal and the second terminal of said second choke, said bias circuit including in series a third choke and a resistive element whose resistance varies inversely in relation to the amplitude of the direct current passing through it.

2. A diode phase modulator as claimed in claim 1, wherein said resistive element is a diode.

3. A diode phase modulator as claimed in claim 1, wherein said resistive element is a diode-bridge.

4. A diode phase modulator comprising:
an input for receiving a microwave signal to be modulated and providing a modulated signal;
a diode connected between said input and an earthed terminal;
a first choke having a first terminal connected to said input and a second terminal;
a modulation generator, for providing a modulating signal, connected in series with a capacitor, between the terminal of said first choke and said earthed terminal, and
a d.c. bias circuit connected between said earthed terminal and the second terminal of said first choke, said bias circuit including in series a second choke and a resistive element whose resistance varies inversely in relation to the amplitude of the direct current passing through it.

5. A diode phase modulator as claimed in claim 4, wherein said resistive element is a diode.

6. A diode phase modulator as claimed in claim 4, wherein said resistive element is a diode bridge.

7. A phase modulator device for operation by transmission comprising in combination a plurality of diode phase modulators each comprising:
an input for receiving a microwave signal to be modulated and providing a modulated signal;
a diode having a first terminal connected to said input, and a second terminal;
a first choke connected between said input and an earthed terminal;
a capacitor connected between the second terminal of said diode and said earthed terminal;
a second choke having a first terminal, connected to the second terminal of said diode and a second terminal;
a modulation generator, for providing a modulating signal, connected, in series with a second capacitor, between the second terminal of said second choke and said earthed terminal,
a d.c. bias circuit connected between said earthed terminal and the second terminal of said second choke, said bias circuit including in series a third choke and a resistive element whose resistance varies inversely in relation to the amplitude of the direct current passing through it, said device comprising a plurality of elementary modulators of identical structure, connected in series, each elementary modulator comprising:

an input terminal for receiving a microwave signal to be modulated and an output terminal for delivering a modulated signal;

a first propagation line connected between said input and output terminals and having a first and a second junction point, the respective distance between said input and said first junction point and between said output and said second junction point being equal to one quarter of the operating wave length of said signal to be modulated and the distance between said first and second junction points having a predetermined length;

a second propagation line connected between said input and output terminals, having a third junction point arranged in the middle of said line, the length of which is equal to one half of said operating wave length and three diode phase modulators respectively coupled to said junction points.

8. A phase modulator device for operation by transmission comprising in combination a plurality of diode phase modulators each comprising:

an input for receiving a microwave signal to be modulated and providing a modulated signal;

a diode having a first terminal connected to said input, and a second terminal;

a first choke connected between said input and an earthed terminal;

a capacitor connected between the second terminal of said diode and said earthed terminal;

a second choke having a first terminal, connected to the second terminal of said diode and a second terminal;

a modulation generator, for providing a modulating signal, connected, in series with a second capacitor, between the second terminal of said second choke and said earthed terminal;

a d.c. bias circuit connected between said earthed terminal and the second terminal of said second choke, said bias circuit including in series a third choke and a resistive element whose resistance varies inversely in relation to the amplitude of the direct current passing through it, said device comprising:

an input terminal for receiving a microwave signal to be modulated and an output terminal for delivering a modulated signal;

a transmission line connected between said input and output terminals and having a plurality of pairs of junction points, the respective distances between said junction points of each pair having a predetermined length, said diode phase modulators being coupled to said junction points.

* * * * *